Figure 1:
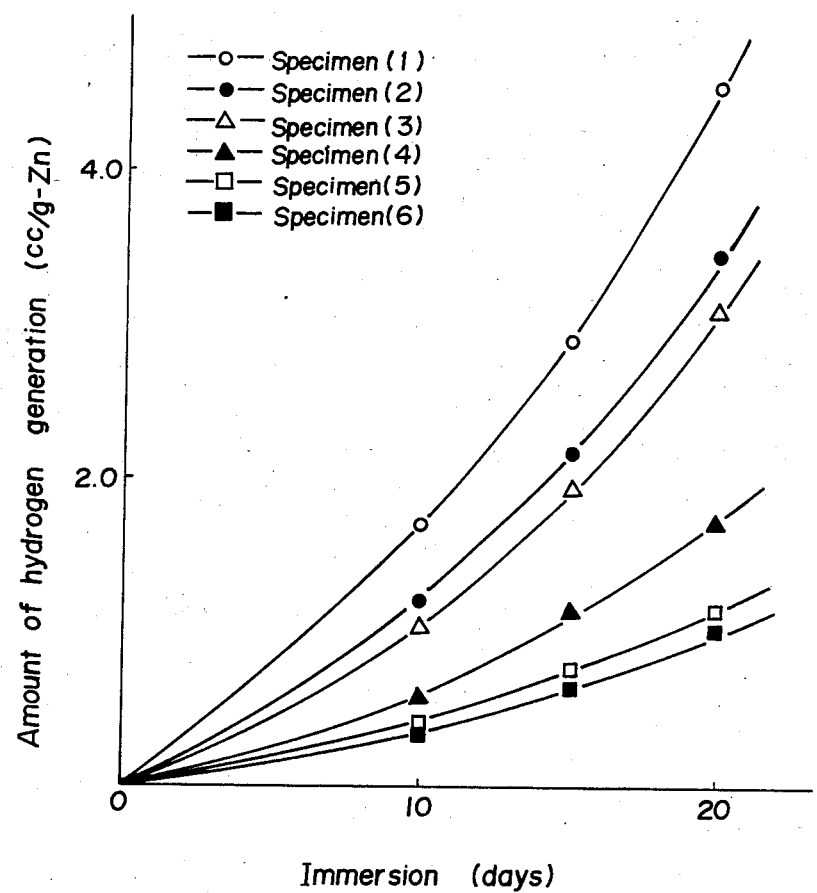

United States Patent [19]

Takeda et al.

[11] Patent Number: 4,592,974

[45] Date of Patent: Jun. 3, 1986

[54] ACTIVE MATERIAL FOR NEGATIVE POLES OF ALKALINE DRY CELLS, AND METHOD FOR MAKING SAID MATERIAL

[75] Inventors: Ryuzo Takeda; Shigeru Ooyama; Yukio Ishibashi, all of Akita, Japan

[73] Assignee: Dowa Mining Co., Ltd., Tokyo, Japan

[21] Appl. No.: 687,369

[22] Filed: Dec. 28, 1984

[30] Foreign Application Priority Data

Aug. 15, 1984 [JP] Japan .................. 59-170228

[51] Int. Cl.$^4$ ............................ H01M 4/42
[52] U.S. Cl. ...................... 429/229; 420/513
[58] Field of Search ............ 429/229, 231; 420/513, 420/523

[56] References Cited

U.S. PATENT DOCUMENTS

| | | | |
|---|---|---|---|
| 4,084,047 | 4/1978 | Himy et al. ............... | 429/229 X |
| 4,224,391 | 9/1980 | Eisenberg ................ | 429/229 X |
| 4,327,157 | 4/1982 | Himy et al. ............... | 429/229 X |
| 4,328,297 | 5/1982 | Bilhorn .................... | 429/229 X |
| 4,473,625 | 9/1984 | Watakabe et al. ......... | 429/229 X |

FOREIGN PATENT DOCUMENTS 12843 7/1966 Japan ............................ 429/229
26455 2/1983 Japan ............................ 429/229

OTHER PUBLICATIONS

Himy, Substitutes for Mercury in Alkaline Zinc Batteries II, Proceedings–Power Sources Symposium, vol. 28, 1978.

*Primary Examiner*—Anthony Skapars
*Attorney, Agent, or Firm*—Shlesinger, Arkwright, Garvey & Fado

[57] ABSTRACT

Novel active materials for negative poles in alkaline dry cells, and method of preparing the same are disclosed. Said materials and method do not employ harmful Hg. In place of Hg, an alloy containing at least three elements selected from Bi, Pb, In, Cd, and Ga is used to have a zinc dust alloyed at its outer surfaces with said alloy elements which are afforded with a high hydrogen overvoltage effective to retard the generation of hydrogen due to self erosion of the zinc dust in an alkaline solution of the dry cells.

7 Claims, 2 Drawing Figures

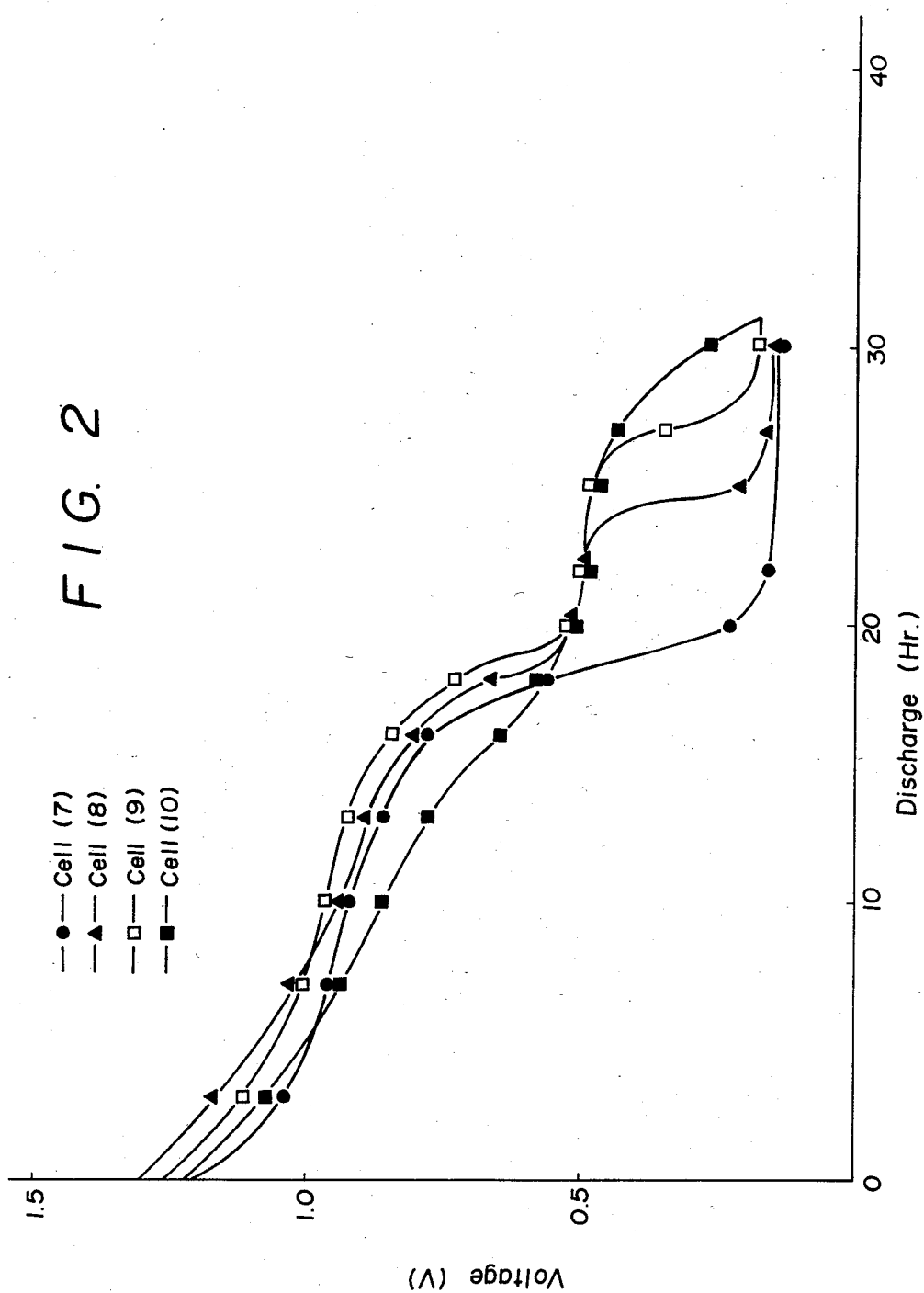

ACTIVE MATERIAL FOR NEGATIVE POLES OF ALKALINE DRY CELLS, AND METHOD FOR MAKING SAID MATERIAL

BACKGROUND OF THE INVENTION

This invention relates to an active material for a negative pole of alkaline dry cells, which is consisted of an alloyed zinc dust made without the employment of any mercury. This invention also relates to a method of preparing said active material.

In those conventional negative zinc poles of alkaline dry cells which are widely used today in portable electrical and electronic appliances such as watches, cameras, radios, cassette tape recorders, caluculators, and so, there is added 4–10% of Hg for the retardation of the generation of hydrogen accompanied to their self erosion in an alkaline solution.

As they employ a comparatively large amount of Hg, they would cause environmental pollution when they are scrapped. In addition, since they are harmful to health, Hg employed in dry cells becomes recently an object of public concern.

In view of the above, it has been sought for to make an active material for a negative pole of alkaline dry cells without the employment of any mercury.

BRIEF SUMMARY OF THE INVENTION

Hence, it is the object of this invention to provide an active material for a negative pole of alkaline dry cells made without the employment of Hg, and a method for preparing the same.

More in detail, in the manufacture of an active material for negative zinc poles of alkaline dry cells in accordance with this invention, a zinc dust is stirred in an alkaline solution and suspended therein, and then a liquid alloy containing at least three elements selected from a group consisting of bismuth, lead, indium, cadmium, and gallium is gradually added to the solution for coating and alloying the outer surfaces of the zinc dust. The active material for a negative pole of alkaline dry cells thus manufactured is free from mercury.

The ratios of the alloy elements to be added to the alkaline solution suspended with a zinc dust are 40–50 weight % (with respect to a total weight of the liquid alloy) of bismuth, 18–25 weight % of lead, 18–25 weight % of indium, less than 6 weight % of cadmium, and less than 80 weight % of gallium. At least three elements of them are selected at said ratios. The ratio of the liquid alloy with respect to a zinc dust is most preferably within a range of 0.5–5 weight %, since less than 0.5 weight % of the alloy is a little weak to retard the generation of hydrogen, while more than 5 weight % of it tends to become saturated. The reason why the group of bismuth, lead, indium, cadmium, and gallium is employed for making the liquid alloy is that all of them have electro-chemically high hydrogen overvoltages, and can consequently retard self erosion of zinc. It shall be noted also that the alloy containing bismuth at an amount of 40–50 weight %, lead at an amount of 18–25 weight %, indium at an amount of 15–25 weight %, and cadmium at an amount of less than 6 weight % can advantageously be used in this invention, because it can readily reach liquidus at a temperature, at which the outer surfaces of a zinc dust can be alloyed. In the case of gallium, it shall be less than 80 weight %, since when it is more than 80 weight %, discharge characteristics become lowered.

Since the non-amalgamated zinc dust thus obtained in accordance with this invention has outer surfaces which are firmly alloyed with the aforementioned alloy elements of a high hydrogen overvoltage, it can stand well against erosion in an alkaline solution. When the zinc dust made in accordance with this invention is employed in dry cells, their discharge characteristics are nearly comparable to those of dry cells employing a conventional amalgamated zin dust. Thus, it becomes possible by the use of a non-amalgamated zinc dust of this invention to make alkaline dry cells wirhout harmful mercury.

BRIEF DISCRIPTION OF THE DRAWING

FIG. 1 is a graph showing, in comparison, amounts of the generation of hydrogen of active materials for a negative pole made in accordance with this invention (Specimens (1), (3), (4), (5), and (6)) and a conventional active material (specimen (2)) when they were immersed in an alkaline solution; and FIG. 2 is a graph showing, in comparison, discharge characteristics of sample alkaline-manganese dry cells of UM-1 (7), (8), (9), and (10) employing this invention specimens (4), (5), and (6) and the conventional specimen (2) for negative poles, and manganese dioxide for positive poles, when they were loaded with an outer resistance of 2Ω.

EXAMPLES

This invention is further explained by way of the following examples.

(a) To 1 liter of 10% caustic potash solution, there was added 250 g of zinc dust (of a purity of more than 99.99% and 40–200 mesh). While the solution was stirred at 700° C., a liquid alloy consisting of 45 weight % of bismuth, 23 weight % of lead, 19 weight % of indium, 5 weight % of cadmium, and 8 weight % of gallium was gradually dropped into the solution until it reached 1.5 weight % of the zinc dust. Then, after the solution was left still for one hour, the zinc dust was washed by water, and then dried to obtain the specimen of non-amalgamated zinc dust (4) of this invention.

(b) By the steps same to the above (a), the non-amalgamated specimens (1), (3), (5), and (6) of this invention were obtained by varying a ratio of the liquid alloy with respect to the zinc dust to 0.3 weight %, 0.5 weight %, 5 weight %, and 7 weight %.

(c) In order to compare, a conventional amalgamated zinc dust (specimen (2)) was made by adding mercury of 5 weight % (with respect to the zinc dust) in place of the liquid alloy.

The specimens (1) to (6) were immersed in a 40% caustic potash solution of 60° C. in order to determine amounts of the generation of hydrogen. The results are shown in FIG. 1.

Sample alkaline-manganese dry cells of UM-1 (7), (8), (9), and (10) were made by employing the specimens (2), (4), (5), and (6) as active materials for their negative poles, and manganese dioxide for positive poles. They were tested of discharge characteristics by loading them an outer resistance of 2Ω. The test results are shown in FIG. 2.

As readily seen in FIG. 1, in spite of the fact that the specimens (3), (4), and (5) did not employ mercury, their amounts of hydrogen generation are as little as the conventional amalgamated specimen (2) or lesser than said specimen.

And, as seen in FIG. 2, the alkaline-manganese dry cells (8) and (9) employing this invention material are comparable to the conventional cell (7) at their discharge characteristics, while the dry cell (10) is a little inferior to the dry cell (7).

As explained above, in place of mercury, this invention employs a liquid alloy containing a combination of elements selected from a group consisting of bismuth, lead, indium, cadmium, and gallium which effectively increase hydrogen overvoltage when combined with a zinc dust, whereby the generation of hydrogen in an alkaline solution is retarded and consequently the leakage of the solution from a cell in storage is well prevented, and whereby discharge characteristics of the cell are well maintained. Harmfulness of mercury to health and its possible environmental pollution which are accompanied with the use of Hg in dry cells as an amalgamated zinc dust, are absolutely eliminated by this invention.

In addition, the manufacture of a novel active material for negative poles of dry cells in accordance with this invention is simple, and as compared with a conventional amalgamation method in which mercury is inevitably employed, the expenditure for dealing with and avoiding pollution is nil in this invention, whereby the manufactureing cost becomes noticeably lessened.

We claim:
1. Active materials for negative poles in alkaline dry cells comprising:
   (a) about 99.7–93% zinc powder alloyed with about 0.3–7% of a liquid alloy comprising at least three elements selected from the group consisting of; 40–50% weight bismuth, 18–25% weight lead, 18–25% weight indium, less than 6% weight cadmium and less than 80% weight gallium.
2. Active materials as in claim 1 and wherein:
   (a) said liquid alloy consisting of 45% weight bismuth, 23% weight lead, 19% weight indium, 5% weight cadmium and 8% weight gallium.
3. Active materials as in claim 1 and wherein:
   (a) said zinc powder alloyed with 0.3% liquid alloy.
4. Active materials as in claim 1 and wherein:
   (a) said zinc powder alloyed with 0.5% liquid alloy.
5. Active materials as in claim 1 and wherein:
   (a) said zinc powder alloyed with 1.5% liquid alloy.
6. Active materials as in claim 1 and wherein:
   (a) said zinc powder alloyed with 5.0% liquid alloy.
7. Active materials as in claim 1 and wherein:
   (a) said zinc powder alloyed with 7.0% liquid alloy.

* * * * *